United States Patent [19]

Antony

[11] 4,125,417
[45] Nov. 14, 1978

[54] METHOD OF SALVAGING AND RESTORING USEFUL PROPERTIES TO USED AND RETIRED METAL ARTICLES

[75] Inventor: Kenneth C. Antony, Kokomo, Ind.

[73] Assignee: Cabot Corporation, Kokomo, Ind.

[21] Appl. No.: 732,486

[22] Filed: Oct. 14, 1976

Related U.S. Application Data

[63] Continuation-in-part of Ser. No. 587,041, Jun. 15, 1975, abandoned.

[51] Int. Cl.² ............................................. C21D 1/78
[52] U.S. Cl. ....................................... 148/131; 148/4
[58] Field of Search ................. 148/131, 130, 4, 12.3, 148/133

[56] References Cited

U.S. PATENT DOCUMENTS

| | | | |
|---|---|---|---|
| 3,496,624 | 2/1970 | Kerr et al. | 148/131 |
| 3,758,347 | 9/1973 | Stalker | 148/131 |
| 3,957,542 | 5/1976 | Cina et al. | 148/12.3 |
| 4,021,910 | 5/1977 | Freeman, Jr. et al. | 148/131 |

FOREIGN PATENT DOCUMENTS 170,659  4/1921  United Kingdom ..................... 148/131

*Primary Examiner*—L. Dewayne Rutledge
*Assistant Examiner*—Peter K. Skiff
*Attorney, Agent, or Firm*—Jack Schuman; Joseph J. Phillips

[57] ABSTRACT

A method of salvaging and restoring physical and mechanical properties to hard and brittle cast metal parts which have undergone creep damage is provided which comprises hot isostatically pressing said metal parts at temperatures and pressures sufficient to undo the creep and eliminate creep-induced micro defects.

7 Claims, 1 Drawing Figure

As Cast

Over - Temperatured

HIP - Salvaged
According to this invention

Relative densities of microdefects in as-cast, over-temperatured and HIP-salvaged blades at 50X.

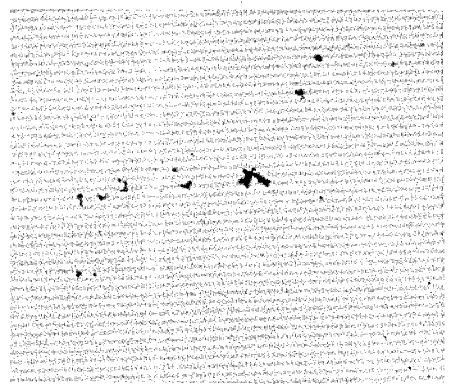
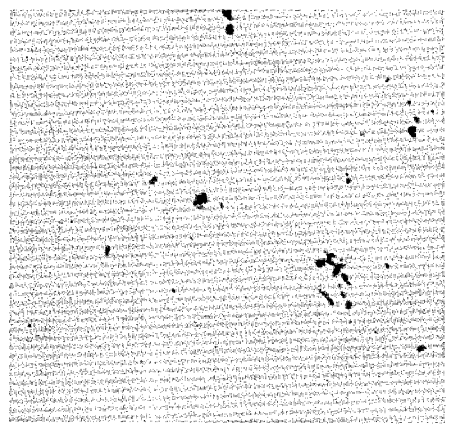
Relative densities of microdefects in as-cast, over-temperatured and HIP-salvaged blades at 50X.

METHOD OF SALVAGING AND RESTORING USEFUL PROPERTIES TO USED AND RETIRED METAL ARTICLES

This application is a continuation-in-part of my application Ser. No. 587,041 now abandoned, filed June 16, 1975.

This invention relates to methods of salvaging and restoring useful properties to used and retired articles made of hard and brittle cast metal and particularly to a method of restoring physical and mechanical properties to such articles used at elevated temperatures which have exceeded their creep life and have been retired or discarded from service.

It is well recognized that many metal parts subjected to stress at high temperatures will, in time, suffer creep damage. The conditions of temperature, stress and time under which creep and stress-rupture failures occur depend on the metal or alloy and on the service environment. Consequently elevated-temperature failures may occur over a wide range of temperatures. In general, however, creep occurs in any metal or alloy at a temperature slightly above the recrystallization temperature of that metal or alloy; at such a temperature, atoms become sufficiently mobile to allow time-dependent rearrangements of structure. If creep persists, microscopically observable voids appear which initiate rupture. Heretofore, the parts so damaged or to which damage is suspected have been removed from service and scrapped. Typical of such parts are, for example, turbine blades used in jet aircraft engines. For safety reasons such blades must be replaced before there is a likelihood of their failure. The replacement of turbine blades is, of course, a major item cost in this particular field of use, among others.

Turbine blades are made of hard and stress-resistant cast alloys which are desirably hard and necessarily brittle. An alloy quite generally used for such blades is 713C alloy which has the chemical composition: 0.14% C, 1% max Co, 13% Cr, 4.5% Mo, 2.5% max W, 0.010 B, 6% Al, 0.7% Ti, up to 3% other transient elements and the balance Ni. The room temperature hardness of this alloy is typically Rockwell C38 and its ductility, measured as elongation, is about 6%.

The temperature to which jet engine turbine blades are subjected is considered to be approximately that of the exhaust gases, the temperature of which can be measured. Such temperatures in commercial turbine blades made from high temperature alloys such as 713C alloy range from about 500° C. (923° F.) to 655° C. (1211° F.). The following quantitative relation between exhaust gas temperature and creep, in arbitrary units, has been proposed:

| EGT | CREEP |
| --- | --- |
| 500° C (932° F) | 1 unit/hr. |
| 580° C (1076° F) | 5 units/hr. |
| 620° C (1148° F) | 50 units/hr. |
| 655° C (1211° F) | 2500 units/hr. |

The creep damage accumulated in a 15 minute excursion at an EGT of 655° C. is greater than that accumulated in 500 hours at an EGT of 500° C.

In general, blades of 713C alloy are removed and scrapped if they have been subjected to excursions at temperatures of 640° C. (1184° F.) or higher. Metallographic examination of such blades does not always disclose voids. Metallographic examination of blades subjected to overtemperature of 800° C. (1472° F.) revealed the presence of creep-induced grain boundary voids, as well as, of course, other internal defects attributable to the original method of manufacture. These hard and relatively brittle blades, although damaged by creep, do not exhibit any measurable strain.

It is an object of my invention to provide a process of treating hard and brittle cast articles which have undergone creep sufficient to degrade one or more of their mechanical properties, so as to reverse or undo that creep and restore the mechanical properties to their original values. It is another object to undo the rearrangement of atoms resulting in creep by the application to the article of heat and pressure. Other objects of my invention will appear in the course of the description thereof which follows.

I have found that creep can be reversed and the stress-rupture properties of hard and brittle cast articles which had been removed from service because of overtemperature conditions and/or creep damage can be restored to or, in some cases, exceed original equipment level by hot isostatic processing (HIP).

Perferably, I hot isostatically press the parts to be restored in an inert atmosphere such as argon or helium gas inside a high pressure autoclave at temperatures not less than and preferably considerably exceeding the overtemperature to which the articles have been subjected, but below the temperature at which incipient melting of the article commences. The broad temperature range preferred by me for such treatment is from about 1800° F. to 2300° F. depending on the metal being treated. The pressures required are in the range from 5,000 to 50,000 p.s.i., again depending upon the metal and its condition. Times required are inversely proportional to the temperature and pressure, and may be as short as two hours.

The invention can perhaps best be understood by reference to examples of its practice applied to metal parts which had been removed from service because of overtemperature conditions.

In order to determine the effectiveness of the practice of this invention, the dovetail properties and airfoil properties of a new, unused blade (identified as As-Cast) made of 713C alloy were compared with a used, over-temperatured blade and with used, overtemperatured blades treated according to this invention. The properties are summarized in Table I below:

TABLE

| | Dovetail Section | | | | | Airfoil Section |
| --- | --- | --- | --- | --- | --- | --- |
| | RT Tensile | | | Stress-Rupture | | Stress-Rupture |
| Blade History | .2 YS (ksi) | UTS (ksi) | RA (%) | 1400° F/ 100 ksi (hrs) | 1800° F/ 22 ksi (hrs) | 1800° F/ 22 ksi (hrs) |
| As-Cast (new, unused blade) | 121 | 127 | 7 | — | 42 | 29 |
| Over-Temperatured | 107 | 112 | 7 | 2.9 | 58 | 11.5 |

TABLE -continued

| | Dovetail Section | | | | | Airfoil Section |
| --- | --- | --- | --- | --- | --- | --- |
| | RT Tensile | | | Stress-Rupture | | Stress-Rupture |
| Blade History | .2 YS (ksi) | UTS (ksi) | RA (%) | 1400° F/ 100 ksi (hrs) | 1800° F/ 22 ksi (hrs) | 1800° F/ 22 ksi (hrs) |
| HIP'ed | 101 | 121 | 14 | 1.0 | 32 | 16 |
| HIP'ed + Heat Treatment A | 132 | 141 | 14 | 21.5 | 41 | 24 |
| HIP'ed + Heat Treatment B | 123 | 137 | 14 | 6.0 | 86 | 37 |
| Specification Minimum | 100 | 110 | (3)* | — | 23 | 23 |

*Elongation minimum - RA not specified
These data clearly show that original equipment properties have been restored (actually exceeded) in overtemperatured blades by the hot isostatic pressing and heat treating according to the process of this invention.

It should be pointed out that turbine blades are most highly stressed at an area near the tip of the airfoil section, where the metal is so thin that it is difficult to obtain adequate test specimens. For this reason, test specimens were also taken from the dovetail section, which is heavier but is subjected to lower stress.

In this particular example, the blades were hot isostatically pressed in a high temperature, high pressure autoclave in an atmosphere of argon at 2250° F. and a pressure of 15,000 p.s.i., for about two hours.

Heat treatment A consisted of the following steps:
2250° F.; ½ hour; Rapid air cool Heat treatment B consisted of the following steps:
2250° F.; ½ hour; Rapid air cool
1600° F.; 2 hours; air cool The effectiveness of HIP salvaging in undoing the creep-induced rearrangement of atoms is illustrated in the accompanying Figure, which illustrates as cast, over-temperatured and HIP salvaged micrographs of turbine blades. The density of microscropically observable voids in the as-cast blade was actually greater than that in the overtemperatured blade, which presumably contained creep-induced micro defects as well as as cast micro defects. This discrepancy accentuates the variability associated with cast products. The important point, however, is that despite this variability HIP processing actually reversed creep, and also closed micro defects which were present in the as-cast blade.

Metallurgical examination of the blades treated by my process revealed no indication of alloy depletion in the surface layer of the blades and measurements of the blades before and after treatment showed no significant alteration in blade dimensions or twist.

It is necessary in my process to hold the temperature of isostatic pressing below the temperature at which incipient melting of the metal commences to avoid blade distortion. The dimensional tolerances on turbine blades and the limits on twist are severe.

It is also necessary in my process to heat and stress the overtemperatured blades at levels which would cause creep damage to an as-cast previously unused blade in order to overcome and undo the rearrangement of atomic structure which has resulted from the overtemperaturing. The temperature of pressing is desirably well above the overtemperature to which the blade has been subjected, so that a relatively short time at that temperature and pressure is required.

While I have illustrated and described certain presently preferred practices of my invention in the foregoing specification, it will be understood that this invention may be otherwise embodied within the scope of the following claims.

I claim:

1. A method of salvaging parts to restore the mechanical properties to substantially their original values of hard brittle cast alloys which have been subjected to high temperature stressing in use sufficient to cause creep therein, but not measurable strain and degrade at least some of their mechanical properties, which parts have passed their normal service life and been removed from service comprising hot isostatically pressing those parts at a temperature above that high temperature at which creep occurred, but below the temperature at which incipient melting of the metal commences, for a time sufficient to reverse that creep and improve one or more of those degraded mechanical properties and thereafter heat treating said parts to restore the mechanical properties to their original values so that said parts may be returned to service.

2. The method of claim 1 in which the parts before pressing have a hardness of about Rockwell C 38.

3. The method of claim 1 in which the temperature of hot isostatic pressing is between about 1800° F. and 2300° F.

4. The method of claim 3 in which the time is at least about two hours.

5. The method of claim 1 in which the parts are hot isostatically pressed at pressures between about 5,000 p.s.i. and about 50,000 p.s.i.

6. The method of claim 5 in which the time is at least about two hours.

7. The method of claim 1 in which the heat treating step comprises heating the hot isostatically pressed part to a temperature of about 2250° F. for a time of at least ½ hour and then rapidly cooling the part in ambient air.

* * * * *

UNITED STATES PATENT AND TRADEMARK OFFICE
CERTIFICATE OF CORRECTION

PATENT NO. : 4,125,417
DATED : November 14, 1978
INVENTOR(S) : Kenneth C. Antony It is certified that error appears in the above-identified patent and that said Letters Patent are hereby corrected as shown below:

Column 1, line 51, "(923° F.)" should be --(932° F.)--.

Signed and Sealed this

Twentieth Day of November 1979

[SEAL]

Attest:

RUTH C. MASON
Attesting Officer

LUTRELLE F. PARKER
Acting Commissioner of Patents and Trademarks